(12) United States Patent
Bardin et al.

(10) Patent No.: US 10,634,273 B2
(45) Date of Patent: Apr. 28, 2020

(54) LIQUID TRANSFER DEVICE AND A TANK ASSEMBLY COMPRISING SUCH A TRANSFER DEVICE

(71) Applicant: AKWEL SA, Champfromier (FR)

(72) Inventors: Matthieu Bardin, Chatuzangue le Goubet (FR); Bastien Bacquet, Romans sur Isere (FR); Jean-Michel Issartel, Romans sur Isere (FR); Régis Munoz, Saint Rambert d'Albon (FR); Mathieu Mekraz, Valence (FR); Antoine Rohaut, Saint Hilaire du Rosier (FR); Séverine Roos, Guilherand Granges (FR); Céline Turpin, Saint Marcel les Valence (FR)

(73) Assignee: AKWEL SA, Champfromier (FR)

( * ) Notice: Subject to any disclaimer, the term of this patent is extended or adjusted under 35 U.S.C. 154(b) by 0 days.

(21) Appl. No.: 15/200,846

(22) Filed: Jul. 1, 2016

(65) Prior Publication Data

US 2017/0009925 A1   Jan. 12, 2017

(30) Foreign Application Priority Data

Jul. 10, 2015   (FR) ..................................... 15 56612

(51) Int. Cl.
*F16L 53/35*   (2018.01)
*B60K 13/04*   (2006.01)
*B60K 15/03*   (2006.01)

(52) U.S. Cl.
CPC .............. *F16L 53/35* (2018.01); *B60K 13/04* (2013.01); *B60K 15/03* (2013.01); *B60K 2015/03427* (2013.01); *F01N 2610/02* (2013.01); *F01N 2610/10* (2013.01); *F01N 2610/1406* (2013.01)

(58) Field of Classification Search
CPC ..... F01N 2610/10; F16L 53/005; F16L 53/30; F16L 53/35; Y10T 137/6606; B60K 13/04
See application file for complete search history.

(56) References Cited

U.S. PATENT DOCUMENTS

| | | | |
|---|---|---|---|
| 2009/0127265 A1* | 5/2009 | Magnusson | F01N 3/2066 220/564 |
| 2010/0146940 A1 | 6/2010 | Goulette et al. | |
| 2012/0225396 A1* | 9/2012 | Harr | F01N 3/2066 432/120 |

(Continued)

FOREIGN PATENT DOCUMENTS

| | | |
|---|---|---|
| DE | 102009045721 A1 | 4/2011 |
| DE | 102009046954 A1 | 5/2011 |

(Continued)

OTHER PUBLICATIONS

March 31, 2016 Search Report issued in French Patent Application No. 1556612.

*Primary Examiner* — Kevin F Murphy
(74) *Attorney, Agent, or Firm* — Oliff PLC

(57) ABSTRACT

This transfer device includes at least one body defining at least partially a transfer conduit having a first orifice and a second orifice, and one heating member arranged at least partially in the body so as to heat the at least one transfer conduit. The first orifice and the second orifice are offset i) on the one hand, along a first direction, and ii) on the other hand, along a second direction, the second direction being perpendicular to the first direction.

39 Claims, 6 Drawing Sheets

(56) References Cited

U.S. PATENT DOCUMENTS

| | | | | |
|---|---|---|---|---|
| 2012/0315196 | A1* | 12/2012 | Maus | F01N 3/2066 422/174 |
| 2013/0000760 | A1* | 1/2013 | Crary | F01N 3/2066 137/565.17 |
| 2013/0269789 | A1* | 10/2013 | Fromont | G05D 23/00 137/59 |
| 2015/0210159 | A1 | 7/2015 | Maguin et al. | |
| 2015/0233274 | A1* | 8/2015 | Treudt | F01N 3/2066 60/286 |
| 2015/0300230 | A1* | 10/2015 | Brueck | F01N 3/2066 137/1 |

FOREIGN PATENT DOCUMENTS

| | | | | |
|---|---|---|---|---|
| DE | 102012108273 A1 | 3/2014 | | |
| WO | WO 2014086553 A1 * | 6/2014 | ........... | F01N 3/2066 |
| WO | WO-2014198596 A1 * | 12/2014 | ........... | F01N 3/2066 |

* cited by examiner

LIQUID TRANSFER DEVICE AND A TANK ASSEMBLY COMPRISING SUCH A TRANSFER DEVICE

The present invention concerns a transfer device for transferring a liquid between a tank and a supply module, the transfer device being placed in the tank and close to the bottom of the tank. In addition, the present invention concerns a tank assembly comprising such a transfer device and a tank configured to contain the liquid.

The present invention is applied to the field of tank assemblies comprising a device for transferring a liquid out of the tank. In particular, the present invention may be applied to the field of motor vehicles comprising such a tank assembly. More particularly, the present invention may be applied to a tank of an aqueous urea solution, such as a solution referred to by the trademark AdBlue™. By motor vehicle, are meant, in particular, passenger vehicles, commercial vehicles or industrial vehicles such as trucks for example.

The document US2010146940A1 describes a tank assembly comprising a tank and a transfer device which is placed in the tank and close to the bottom. The transfer device comprises a heating member for heating the liquid in order to avoid an obstruction by frozen liquid. During assembly of the tank assembly of US2010146940A1, the transfer device is brought by the top of the tank.

However, in order to supply electric power to the heating member of US2010146940A1, we have to immerse a bundle of electrical cables in the liquid. Still, some liquids, for example an aqueous urea solution, are corrosive and erosive. In addition, the expansion during freezing of the liquid may subject the bundle of electrical cables to high mechanical stresses. Moreover, in order to be able to draw as much liquid as possible, the transfer device of US2010146940A1 has to be positioned at the bottom of the tank. This positioning is sometimes difficult to maintain when the tank undergoes dimensional variations under the effect of pressure and temperature fluctuations, which are sometimes called lunging (reversible effect of pressure variations) and creeping (irreversible effect).

Moreover, in the state of the art, there is known a tank assembly the transfer device of which is inserted in the tank through a hole formed in the bottom of the tank. A supply module external to the tank is connected to the transfer device. The supply module has in particular the function of distributing a liquid, for example an aqueous urea solution in a motor vehicle, from a tank containing the liquid toward a downstream conduit.

However, the hole is large enough to enable the insertion of the largest cross-section of the transfer device. Hence, since the sealing surface is large, this hole requires numerous and robust, therefore bulky and expensive, sealing members. Despite these sealing members, such an assembly poses significant risks of failure of one or more of the component(s) achieving the sealing function. Moreover, since the supply module protrudes below the bottom of the tank, the supply module mobilizes a significant space under the tank, which reduces the ratio between the usable volume of the tank and the total space requirement necessary for the tank assembly.

The present invention aims in particular to solve all or part of the aforementioned problems.

For this purpose, an object of the present invention is a transfer device, for transferring a liquid between a tank and a supply module, the transfer device being intended to be placed in the tank and close to a bottom of the tank, the transfer device comprising at least:

a body defining at least partially at least one transfer conduit, said at least one transfer conduit having a first orifice and a second orifice, and a heating member arranged at least partially in the body so as to heat said at least one transfer conduit;

the transfer device being characterized in that the first orifice and the second orifice are offset i) on the one hand, along a first direction, and ii) on the other hand, along a second direction, the second direction being perpendicular to the first direction.

Consequently, said at least one transfer conduit is arranged so that the first orifice and the second orifice are offset along a first direction, and so that the first orifice and the second orifice are offset along a second direction, the second direction being perpendicular to the first direction. In other terms, said at least one transfer conduit extends transversely to the first direction. Thus, said at least one transfer conduit may extend obliquely or perpendicularly to the first direction.

Thus, such a transfer device may present minimum space requirement, because it integrates the heating member. In addition, the arrangement of said at least one transfer conduit allows embedding a supply module just below the bottom of the tank, therefore maximizing the ratio between the overall volume of the tank and the usable volume of the tank, while minimizing the sealing constraints between the transfer device and the tank. The supply module has in particular the function of distributing liquid toward an injector, via a downstream conduit. Furthermore, the integration of the transfer conduit with the heating member allows avoiding interrupting the heat chain, that is to say the whole aqueous urea solution supply circuit which is heated in order to avoid the formation of urea pellets.

The first orifice is configured for the passage of the liquid. The second orifice is configured for the passage of the liquid. Said at least one transfer conduit extends between the first orifice and the second orifice. Depending on the direction of circulation of the liquid when the transfer device is placed in the tank in service configuration, the first orifice may form an outlet or an inlet of said at least one transfer conduit and, conversely, the second orifice may form an inlet or an outlet of said at least one transfer conduit.

According to one variant, the body defines at least partially several transfer conduits. For example, several transfer conduits may be disjointed, so as to transfer flows of liquids in a parallel manner.

According to one embodiment, the body and said at least one transfer conduit are arranged so that the first direction is substantially vertical when the transfer device is placed in the tank in service configuration.

Thus, such a body and such a transfer conduit allow placing the first orifice and the second orifice at different altitudes. This arrangement of the first orifice and of the second orifice allows forming a protruding portion on the bottom of the tank, therefore an external cavity under the tank where the supply module may be housed with minimum space requirement.

According to one variant, the first orifice and the second orifice are arranged so that the altitude of the first orifice is lower than the altitude of the second orifice when the transfer device is placed in the tank in service configuration.

An altitude may be measured with respect to a reference plane of the motor vehicle, this reference plane being horizontal when the motor vehicle is placed on a horizontal ground.

According to one embodiment, the heating member comprises a first heating portion and a second heating portion which are arranged so that the altitude of the first heating portion is lower than the altitude of the second heating portion when the transfer device is placed in the tank in service configuration, the first heating portion extending transversely to the second heating portion.

In other terms, the first heating portion extends over a first surface, the second heating portion extends over a second surface, and the first surface is transverse to the second surface.

Thus, such first and second heating portions allow heating not only an area of the bottom of the tank, but also a substantial portion of said at least one transfer conduit, which avoids any obstruction due to freezing of the liquid.

According to one variant, the second heating portion is substantially perpendicular to the first heating portion.

According to one variant, the first heating portion is configured to extend substantially horizontally when the transfer device is placed in the tank in service configuration. Thus, such a first heating portion allows heating an area of the bottom of the tank.

According to one variant, the second heating portion is configured to extend substantially vertically when the transfer device is placed in the tank in service configuration. Thus, such a first heating portion allows heating a substantial portion of said at least one transfer conduit.

According to one embodiment, the first heating portion extends on either side of the first orifice, and the second heating portion extends on either side of the first orifice.

Thus, such a first heating portion and such a second heating portion allow heating a large area of the bottom of the tank.

According to one embodiment, the heating member has the general shape of a ring extending over an angle comprised between 250 degrees and 360 degrees, the first orifice being located on or close to the ring.

In other terms, the ring may be open or closed.

According to one variant, the ring has a curvilinear, for example circular, base. Alternatively to this variant, the ring may have a polygonal, for example rectangular, base.

Since the heating member is arranged at least partially in the body, the body too has the general shape of a ring extending over an angle comprised between 250 degrees and 360 degrees.

Thus, such a first heating portion and such a second heating portion allow heating a large area of the bottom of the tank.

According to one embodiment, the transfer device further comprises a securing portion configured to secure the transfer device and the tank.

Thus, such a securing portion allows rapidly securing the transfer device and the tank.

According to one variant, the transfer device comprises a heating equipment configured to heat the securing portion when the transfer device is in service. This heating equipment may be formed for example by the heating member.

According to one embodiment, the heating member is arranged completely in the body.

Thus, such a configuration allows completely isolating the heating member from the liquid, which may be corrosive. According to one variant, the transfer device comprises several heating members. In this variant, each heating member may be configured to be connected to an electric power supply independently from the other heating member(s). Alternatively, all heating members may be configured to be connected to the same electric power supply.

According to one variant, the body comprises at least one polymer material, the heating member being overmolded at least partially in said at least one polymer material.

Thus, such a polymer material allows manufacturing a body having a complex three-dimensional shape, therefore well adapted to the geometry of the bottom of the tank. In addition, since the heating member is overmolded in the body, the heating member is isolated from the liquid.

According to one variant, said at least one polymer material is a thermoplastic material.

According to one embodiment, the heating member is configured to convert electrical energy into thermal energy, the heating member comprising for example electrical resistances.

Thus, such a heating member allows heating the liquid rapidly and effectively, while having a reduced space requirement.

According to one variant, the heating member comprises at least one component selected in the group constituted by an electrical resistor and a Positive Temperature Coefficient (PTC) resistor.

According to one embodiment, the transfer device further comprises electrical connectors which are electrically connected to the heating member and which extend at least partially out of the body.

Thus, such electrical connectors allow electrically connecting the heating member to an external electric source, so as to supply electric power to the heating member.

According to one variant, at least one of said electrical connectors extends close to the second orifice. In this variant, each electrical connector may extend close to the second orifice.

According to one embodiment, the transfer device further comprises a connecting element which is fluidically connected to the second orifice, the connecting element being configured to fluidically connect said at least one transfer conduit to the supply module.

Thus, such a connecting element allows connecting the transfer device to a supply module with minimum space requirement.

According to one variant, the electrical connectors and the connecting element delimit a joining surface intended to be disposed between the transfer device and the tank, the joining surface having a surface area smaller than 500 mm$^2$.

According to one variant, the connecting element extends between the electrical connectors.

According to one embodiment, said at least one transfer conduit comprises at least one first section and one second section, the first section and the second section being oriented respectively along a first line and a second line which are intersecting with and transverse to each other.

In other words, the first section and the second section are linked in pairs, because the first line and the second line are intersecting. In addition, the first section and the second section are not parallel, because the first line and the second line are transverse.

Thus, such sections allow forming the offsets between the first orifice and the second orifice respectively along the first direction and the second direction.

According to one variant, at least one section is rectilinear.

According to one variant, at least one section is curvilinear.

According to one variant, the transfer conduit further comprises a third section which is oriented along a third line which intersects with and is transverse to the second line.

In this variant, the transfer device may comprise a heating equipment arranged to heat the third section. The heating equipment may belong to the heating member.

According to one variant, the third section is rectilinear and substantially horizontal when the transfer device is in service configuration. According to one variant, the third section is formed into an element for connecting the transfer device to the supply module.

According to one variant, the transfer conduit comprises more than three sections, the sections being shaped so as to check in pairs the characteristics of the previous embodiment.

According to one variant, the transfer device further comprises at least one closure component which is secured to the body so as to define a portion of said at least one transfer conduit.

Thus, such a closure component allows manufacturing the body by injection molding, during which at least one pin is placed in the mold so as to reserve the location of the transfer conduit. Nonetheless, in order to be able to extract the pin after the molding operation, the transfer conduit has to present at least one opening which occupies the place of a wall portion of the transfer conduit. The closure component allows filling this opening, therefore completely defining the transfer conduit.

According to one variant, the closure component is integral with the body. In order to manufacture such a closure component, it is possible to insert a core made of a fusible material in the mold for injecting the body.

According to one variant, the transfer device according to the previous embodiment, comprising two closure components which are secured to the body so as to define two respective portions of said at least one transfer conduit.

Thus, the closure components comprise a first closure component and a second closure component, which allow defining respectively portions of a first section and of a third section belonging to the transfer conduit.

According to one variant, the or each closure component comprises a plate, which is for example in the form of a hood or a lid. According to one variant, the or each closure component has generally a planar surface arranged so as to define said respective portion of said at least one transfer conduit.

According to one variant, the two closure components comprise a first closure component and a second closure component, the first closure component being secured to the body so as to define a portion of the first section, the second closure component being secured to the body so as to define a portion of the third section.

According to one embodiment, the transfer device further comprises a filter connected to the first orifice.

Thus, the liquid entering the transfer conduit via the first orifice is first filtered by the filter.

Moreover, an object of the present invention is a tank assembly, for storing a liquid, for example an aqueous urea solution in a motor vehicle, the tank assembly comprising:
- a tank configured to contain the liquid, the tank having a bottom presenting i) a bottom opening configured for the passage of the liquid and ii) a protruding portion which is shaped protruding towards the inner of the tank so as to define a cavity external to the tank under said protruding portion,
- a transfer device according to the invention, the transfer device being placed in the tank and close to the bottom so that the heating member extends at least partially around the protruding portion, the transfer device and the tank being arranged so that the second orifice is positioned facing the bottom opening.

Thus, such a tank assembly may present a maximum ratio between its overall volume and its usable volume, because the transfer device has minimum space requirement. In addition, in contrast with the state of the art, the transfer device can operate in a regular manner, despite the dimensional variations of the tank under the effect of pressure and temperature fluctuations. Indeed, the transfer device is not subjected to the variations of the dimensions between the top and the bottom of the tank (lunging, creeping), because the transfer device is referenced with respect to the bottom of the tank since the transfer device is placed close to the bottom of the tank.

In addition, the arrangement of said at least one transfer conduit allows embedding a supply module just below the bottom of the tank and without any excrescence or projection protruding from the bottom of the tank. Hence, this arrangement of the transfer conduit allows maximizing the usable volume of the liquid contained in the tank, while minimizing the sealing constraints between the transfer device and the tank.

The tank assembly may comprise a tubular portion which channels the liquid out of the transfer device and which is engaged in the bottom opening. Thus, the liquid passes through the bottom opening by circulating in the tubular portion. In other words, the liquid does not wet the bottom opening.

According to one variant, the tank assembly comprises a supply module, and the tubular portion may be secured to the transfer device, while the supply module comprises a female portion complementary to the tubular portion, so as to connect the transfer device to the supply module. Alternatively, the tubular portion may be secured to the supply module, while the transfer device comprises a female portion complementary to the tubular portion, so as to connect the transfer device to the supply module.

According to one embodiment, the tank assembly further comprises a sealing member which is arranged between the transfer device and the tank.

Thus, such a securing member and such a sealing member allow for a rapid and tight assembly of the transfer device with the tank.

According to one variant, the securing member and the sealing member are formed by an annular weld disposed around the bottom opening. Thus, the securing member and the sealing member are integrated into the transfer member.

Alternatively or complementarily to this variant, the securing member and the sealing member may be formed by two different structural components, for example a weld and sealing gasket.

According to one embodiment, the electrical connectors and the connecting element pass through the bottom opening when the tank assembly is in assembled configuration.

Thus, such an arrangement allows minimizing the dimensions of the bottom opening, therefore minimizing the sealing constraints between the transfer device and the tank.

In addition, the securing member allows for a very rigid assembly, with a minimum clearance or displacement of the electrical connectors and of the connecting element, because the electrical connectors and the connecting element are close to the securing member, which minimizes the risks of unintended displacement for example under the effect of vibrations.

According to one variant, the bottom opening has an oblong shape, the connecting element occupying a central region of the bottom opening, the connecting element being located between the electrical connectors.

Alternatively to this variant, the connecting element may not be located between the electrical connectors, but rather next to the electrical connectors.

According to one embodiment, the bottom opening has a surface area smaller than 500 mm².

Thus, the sealing area between the tank assembly and the supply module is very small, which minimizes the risks of failure of the components achieving the sealing function.

According to one variant, the tank assembly further comprises at least one sealing gasket arranged to delimit a dry area around the bottom opening when the tank assembly is in service.

According to one variant, the tank assembly further comprises at least one sealing gasket which is generally annular-shaped and which is disposed between the tank and the transfer device. For example, the tank assembly may comprise several sealing gaskets.

Moreover, an object of the present invention is a motor vehicle comprising such a tank assembly.

The embodiments and the variants mentioned hereinbefore may be considered separately or according to any technically possible combination.

The present invention will be better understood and its advantages will appear in the light of the description that follows, given only as a non-limiting example and made with reference to the appended schematic figures, in which identical reference numerals correspond to structurally and/or functionally identical or similar elements. In the appended schematic figures.

Figure 3:
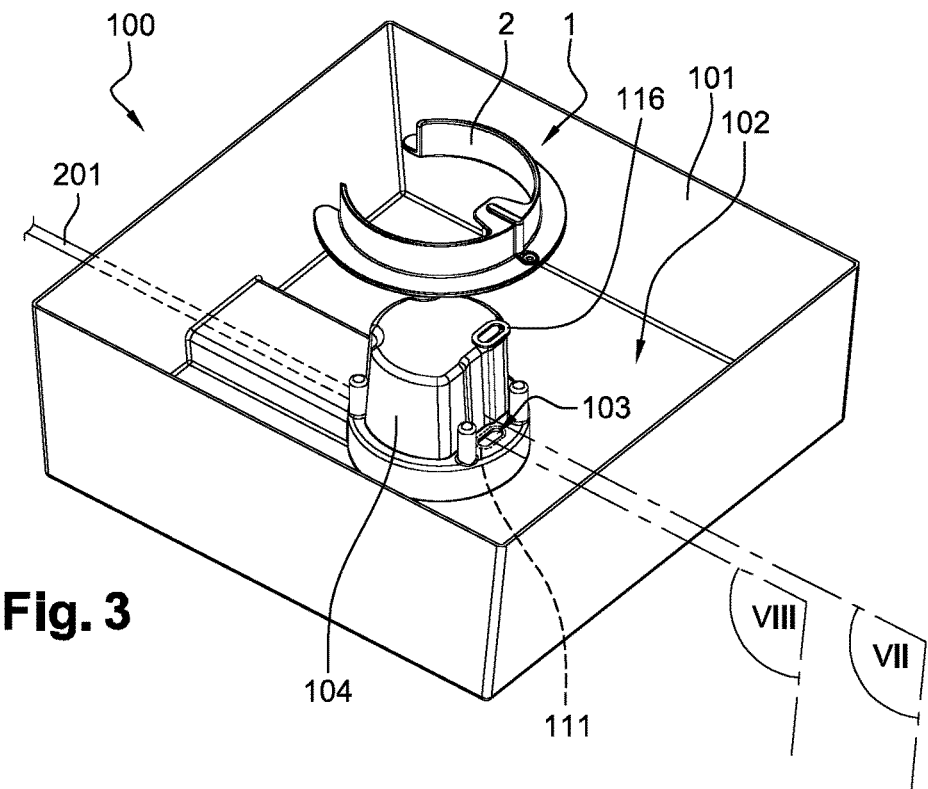
FIG. 3 is an exploded top perspective view of a lower portion of a tank assembly in accordance with the invention and comprising the transfer device of FIG. 1.
Figure 4:
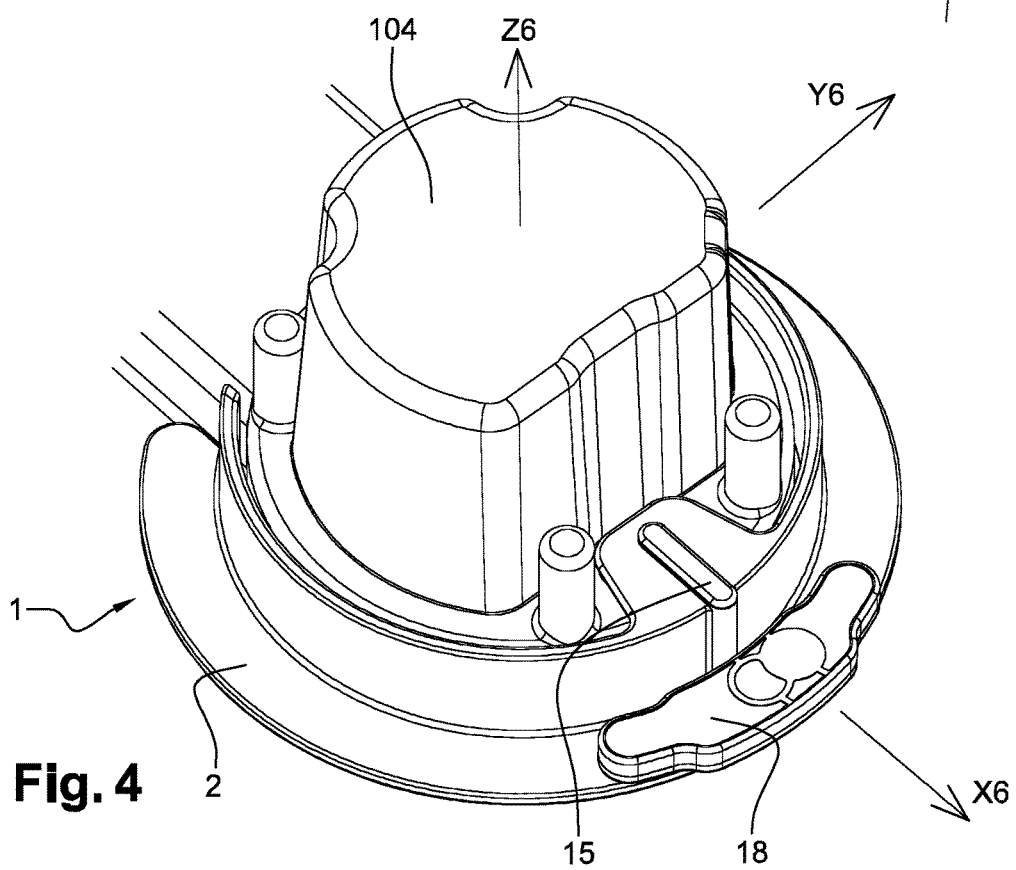
FIG. 4 is an assembled top perspective view at a larger scale of a detail of the lower portion of the tank assembly of FIG. 3.
Figure 5:
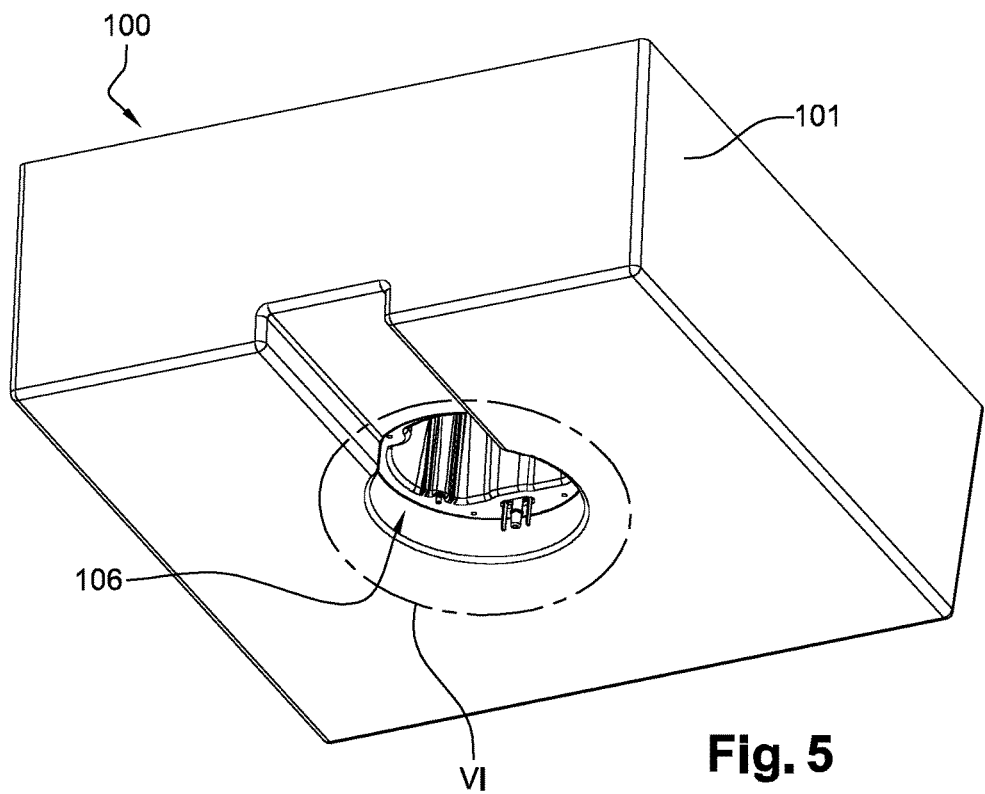
FIG. 5 is an assembled bottom perspective view of the lower portion of the tank assembly of FIG. 3.
Figure 6:
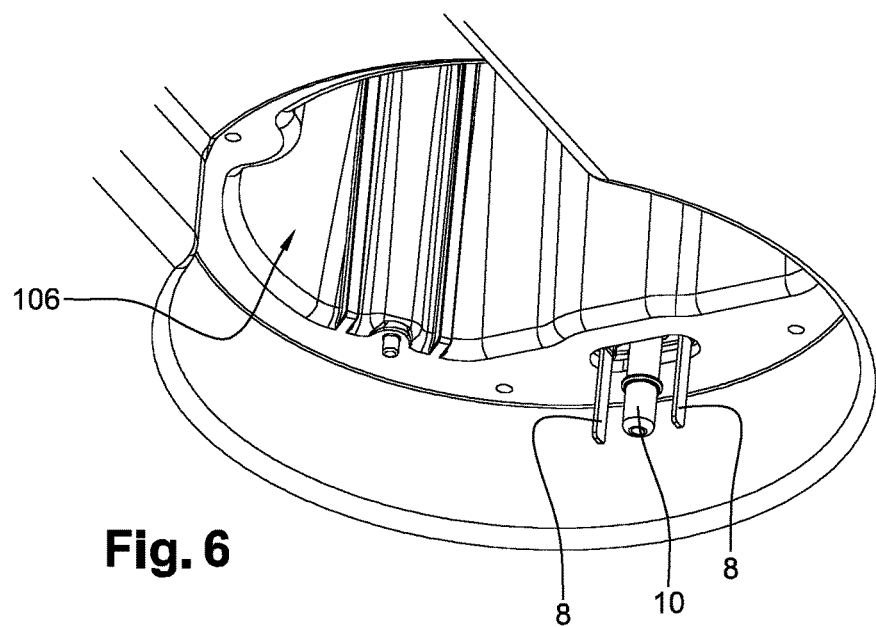
FIG. 6 is a view at a larger scale of the detail VI in FIG. 5.
Figure 7:
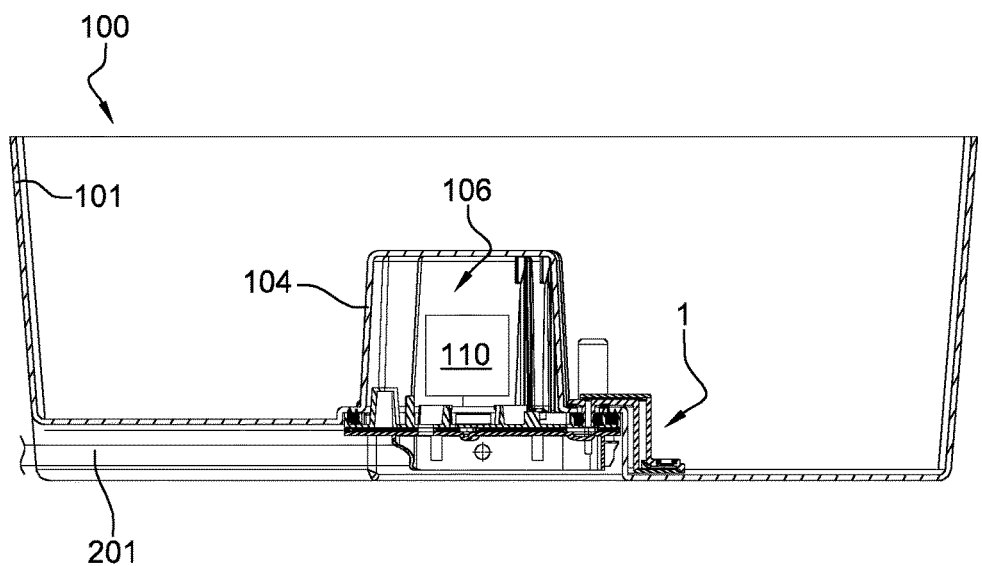
FIG. 7 is a section, along the plane VII in FIG. 3, of the lower portion of the tank assembly of FIG. 3 in assembled configuration.
Figure 8:
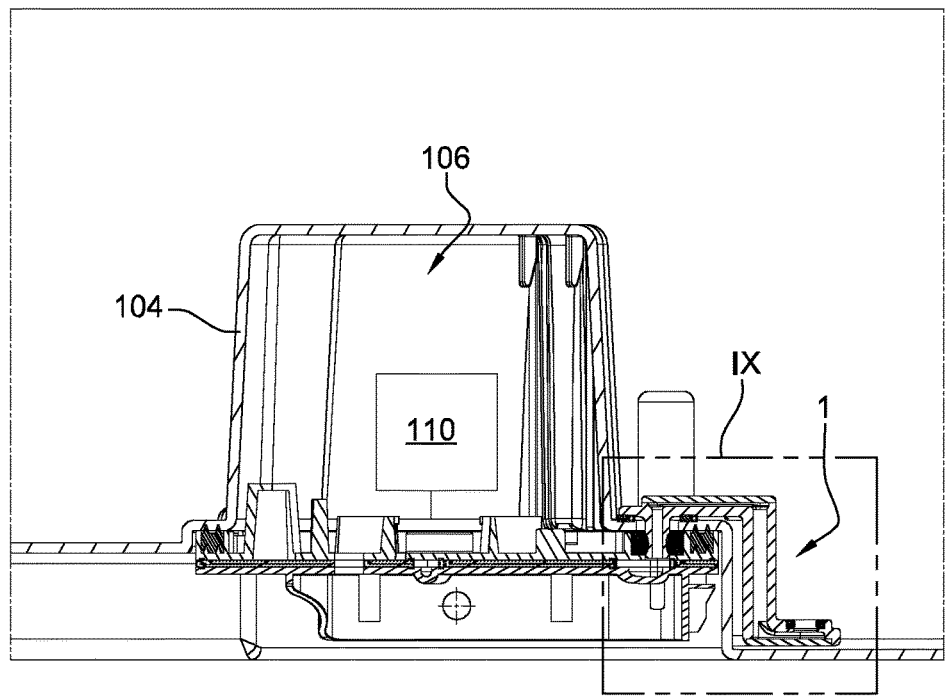
FIG. 8 is a section, along the plane VIII parallel to the plane VII, of the lower portion of the tank assembly of FIG. 3 in assembled configuration.

FIGS. 1, 2, 3, 4, 5, 6, 7, 8, 9 and 11 illustrate a transfer device 1 which has in particular the function of transferring a liquid between a tank 101 and a supply module 110, partially visible in FIGS. 3 and 7, then toward a downstream conduit 201 visible in FIG. 3 and in FIG. 7. In the example of FIGS. 1 to 9, the liquid is an aqueous urea solution.

FIG. 3 illustrates the lower portion of a tank assembly 100 which has in particular the function of storing the aqueous urea solution in a motor vehicle which is not represented. The tank assembly 100 comprises the transfer device 1 and the tank 101. The tank 101 has a bottom 102 and it is configured to contain the liquid. The tank 101 further comprises an upper half-shell which is not represented. This upper half-shell forms the upper portion of the tank assembly 100.

The transfer device comprises a body 2 and a heating member 4. The body 2 defines a substantial portion of a transfer conduit 6. The heating member 4 herein is arranged completely in the body 2 so as to heat the transfer conduit 6.

Figure 9:
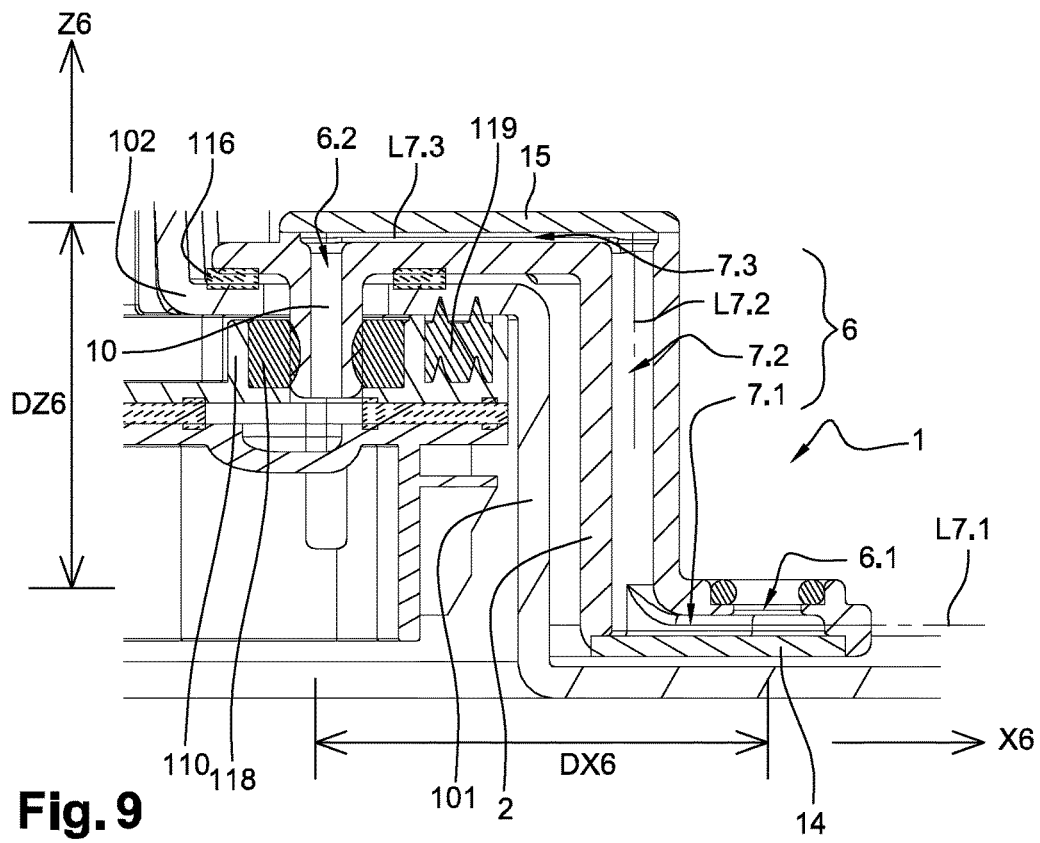
FIG. 9 is a view at a larger scale of the detail IX in FIG. 8.

The transfer conduit 6 has a first orifice 6.1 and a second orifice 6.2, visible in FIG. 9. The transfer conduit 6 extends between the first orifice 6.1 and the second orifice 6.2. The first orifice 6.1 is configured for the passage of the liquid when the transfer device 1 is in service in the tank assembly 100. The second orifice 6.2 is configured for the passage of the liquid when the transfer device 1 is in service in the tank assembly 100.

Depending on the direction of circulation of the liquid when the transfer device 1 is placed in the tank 101 in service configuration, the first orifice 6.1 may form an inlet or an outlet of the transfer conduit 6. Conversely, the second orifice 6.2 may form an outlet or an inlet of the transfer conduit 6.

On the one hand, the first orifice 6.1 and the second orifice 6.2 are offset along a first direction Z6. On the other hand, the first orifice 6.1 and the second orifice 6.2 are offset along a second direction X6. The second direction X6 is perpendicular to the first direction Z6.

According to one variant which is not represented, the first orifice and the second orifice may be shifted along a third direction Y6, perpendicular to the first direction and to the second direction.

The body 2 and the transfer conduit 6 are arranged so that the first direction Z6 is substantially vertical when the transfer device 1 is in service configuration. Thus, the first orifice 6.1 and the second orifice 6.2 are placed at different altitudes when the transfer device 1 is in service configuration. In the example of FIGS. 1 to 9, the altitude of the first orifice 6.1 is lower than the altitude of the second orifice 6.2 when the transfer device 1 is in service configuration.

In the example of FIGS. 1 to 9, the transfer conduit 6 comprises a first section 7.1, a second section 7.2 and a third section 7.3, which are visible in FIG. 9. The first section 7.1, the second section 7.2 and the third section 7.3 are joined in pairs. Furthermore, the transfer conduit 6 comprises a fourth section which is formed by the second orifice 6.2.

The first section 7.1, the second section 7.2 and the third section 7.3 are oriented respectively along a first line L7.1, along a second line L7.2 and along a third line L7.3. The first line L7.1 and the second line L7.2 are intersecting with and transverse to each other. The second line L7.2 and the third line L7.3 are intersecting and transverse with each other. In the example of FIGS. 1 to 9, each of the first section 7.1, second section 7.2 and third section 7.3 is rectilinear.

The first section 7.1, the second section 7.2 and the third section 7.3 form the first offset and the second offset between the first orifice 6.1 and the second orifice 6.2 respectively along the first direction Z6 and the second direction X6.

In the example of FIGS. 1 to 9, the first orifice 6.1 and the second orifice 6.2 are offset along the first direction Z6 by a distance DZ6 equal to about 45 mm; and the first orifice 6.1 and the second orifice 6.2 are offset along the second direction X6 by a distance DX6 equal to about 53 mm.

In service configuration, the transfer device 1 is placed in the tank 101 and close to the bottom 102 of the tank 101. The bottom 102 presents a bottom opening 103 which is visible in FIG. 3. The bottom opening 103 is configured for the passage of the liquid, because it may be crossed by a connecting element 10, as described hereinafter and which can channel the liquid.

In addition, the bottom 102 presents a protruding portion 104 or counter-form. The protruding portion 104 is shaped projecting towards the inner of the tank 101, so as to define an external cavity 106 outside of the tank 101 and under the protruding portion 104, and therefore under the tank 101. As is shown in FIG. 7, the external cavity 106 houses the supply module 110 with minimum space requirement.

In service configuration, the heating member 4 extends partially around the protruding portion 104. The transfer device 1 and the tank 101 are arranged so that the second orifice 6.2 is positioned facing the bottom opening 103.

The heating member 4 comprises a first heating portion 4.1 and a second heating portion 4.2. The altitude of the first heating portion 4.1 is lower than the altitude of the second heating portion 4.2 when the transfer device 1 is in service configuration.

The first heating portion 4.1 extending transversely to the second heating portion 4.2. In the example of FIGS. 1 to 9, the second heating portion 4.2 is substantially perpendicular to the first heating portion 4.1. Thus, the first heating portion 4.1 extends over a first surface and, the second heating portion 4.2 extends over a second surface which is transverse to the first surface 4.1.

The first heating portion 4.1 herein is configured to extend substantially horizontally when the transfer device 1 is in service configuration. In service, the first heating portion 4.1 can heat an area of the bottom 102.

The second heating portion 4.2 is configured to extend substantially vertically when the transfer device 1 is in service configuration. In service, the second heating portion 4.2 can heat a portion of the transfer conduit 6.

The body 2 is composed of a polymer material, in this instance a high-density polyethylene (HDPE), which allows welding the body 2 on the tank 101. The heating member 4 is completely overmolded in this polymer material. Thus, the body 2 has a complex three-dimensional shape which is well adapted to the geometry of the bottom 102.

The first heating portion 4.1 extends on either side of the first orifice 6.1. Similarly, the second heating portion 4.2 extends on either side of the first orifice 6.1 and on either side of the second section 7.2. Thus, the first heating portion 4.1 and the second heating portion 4.2 allow heating a large area of the bottom 102.

Figure 11:
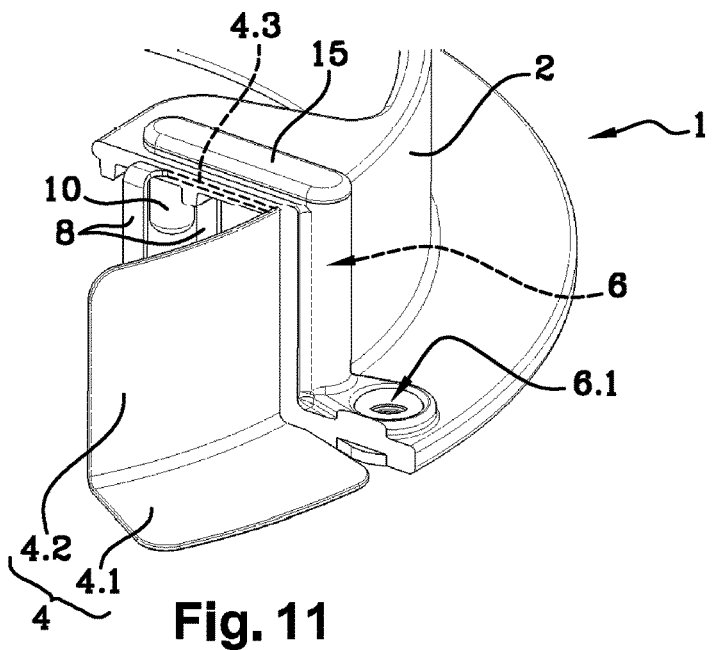
FIG. 11 is a perspective view which illustrates a portion of the transfer device of FIG. 1 and which is partially truncated so as to illustrate the first and second heating portions.

As shown in FIG. 11, the heating member 4 further comprises a third heating portion 4.3 which is arranged to heat the third section 7.3.

When viewed from the top, the body 2 has generally the shape of a «C» or of an open ring extending over an angle equal to about 270 degrees. Similarly, the heating member 4 has generally the shape of a «C», therefore of an open ring. The first orifice 6.1 is located on this open ring.

The heating member 4 is configured to convert electrical energy into thermal energy. In the example of FIGS. 1 to 9, the heating member 4 comprises electrical resistances.

Figure 1:
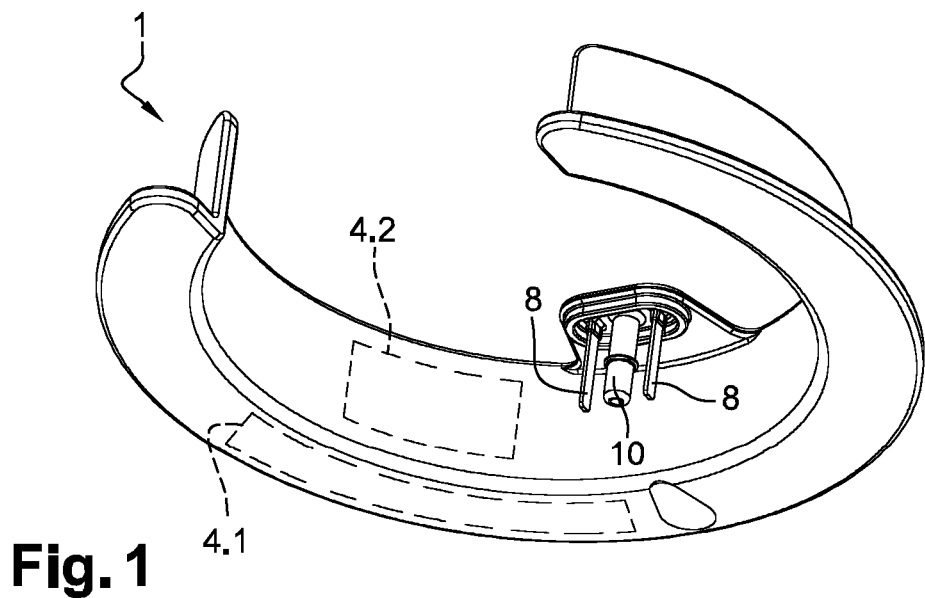
FIG. 1 is a bottom perspective view of a transfer device in accordance with the invention.
Figure 2:
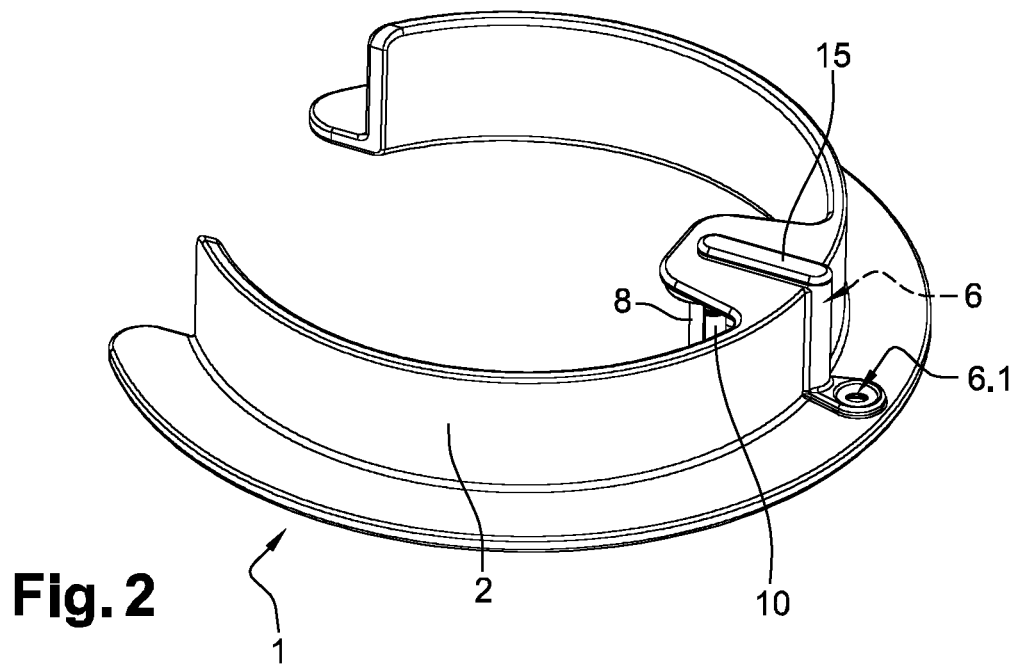
FIG. 2 is a top perspective view of the transfer device of FIG. 1.

As shown in FIGS. 1 and 6, the transfer device 1 further comprises electrical connectors 8 which are electrically connected to the heating member 4 and which extend partially out of the body 2. Each of the electrical connectors 8 extends close to the second orifice 6.2.

When the tank assembly 100 is in service configuration, the electrical connectors 8 electrically connect the heating member 4 to an external electric source which is not represented, so as to supply electric power to the heating member 4.

Furthermore, the transfer device 1 comprises a connecting element 10 which is fluidically, in particular hydraulically, connected to the second orifice 6.2. The connecting element 10 being configured to fluidically connect the transfer conduit 6 to the supply module 110, therefore to the downstream conduit 201.

In the example of FIGS. 1 to 9, the connecting element 10 extends between the electrical connectors 8. The connecting element 10 herein is formed by a nozzle pierced by a central bore intended for the passage of the liquid. This nozzle may be selected among nozzles recommended by the international organization SAE «Society of Automotive Engineers».

The electrical connectors 8 and the connecting element 10 delimit a joining surface 111, which is symbolized in FIG. 3 and which is intended to be located between the transfer device 1 and the tank 101 when the tank assembly 100 is in service configuration. The joining surface 111 has a surface area equal to about 1000 mm$^2$. The bottom opening 103 has a surface area equal to about 450 mm$^2$.

The electrical connectors 8 and the connecting element 10 pass through the bottom opening 103 when the tank assembly 100 is in assembled configuration (FIG. 7). The bottom opening 103 herein has an oblong shape. The connecting element 10 occupies a central region of the bottom opening 103. The connecting element 10 is located between the electrical connectors 8.

Moreover, the transfer device 1 further comprises two closure components, namely a first closure component 14 and a second closure component 15. Each of the first and second closure components 14 and 15 is secured to the body 2 so as to define a portion of the transfer conduit 6.

Each of the first and second closure components 14 and 15 comprises a plate which herein has a planar surface arranged so as to define a respective portion of the transfer conduit 6. The first closure component 14 defines a portion of the first section 7.1. The second closure component 15 defines a portion of the third section 7.3.

In addition, the transfer device 1 comprises a filter 18 which is connected to the first orifice 6.1. The filter 18 may be immobilized with respect to the first orifice 6.1 by a plastic weld on the body 2. The transfer device 1 may comprise an O-ring gasket compressed between the first orifice 6.1 and the filter 18. In service, the liquid entering the transfer conduit 6 via the first orifice 6.1 is filtered by the filter 18.

Figure 10:
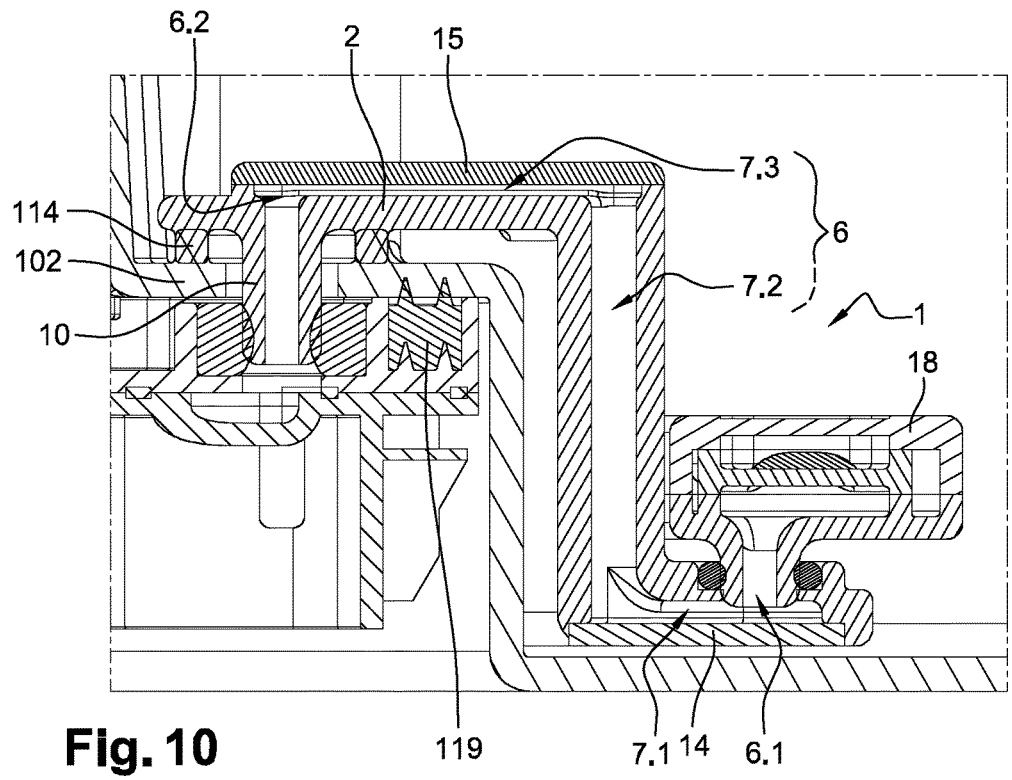
FIG. 10 is a view similar to FIG. 9 and illustrating a variant at the lower portion of the tank assembly of FIG. 3.

As is shown in FIGS. 3, 9 and 10, the tank assembly 100 further comprises:
  a securing member 114 which is arranged so as to secure the transfer device 1 and the tank 101; and
  a sealing member 116 which is arranged between the transfer device 1 and the tank 101.

In the example of FIG. 9, the sealing member 116 is formed by a sealing gasket which is compressed, around the bottom opening 103, between the transfer device 1 and the bottom 102.

The tank assembly 100 further comprises an additional sealing gasket 118 and a lip seal 119 each having an annular-shape. The additional sealing gasket 118 is compressed between the connecting element 10 and the supply module 110. Thus, the additional sealing gasket 118 achieves sealing of the hydraulic circuit. The lip seal 119 is compressed between an external wall of the tank 101 and the supply module 110.

FIG. 10 illustrates a tank assembly 100 and a transfer device 1 in accordance with a second embodiment. To the extent that the tank assembly 100 and the transfer device 1 of FIG. 10 are similar to the tank assembly 100 and to the transfer device 1 of FIGS. 1 to 9 and 11, the description of the tank assembly 100 and of the transfer device 1 given hereinabove in relation to FIGS. 1 to 9 and 11 may be transposed to the tank assembly 100 and to the transfer device 1 of FIG. 10, with the exception of the notable differences set out hereinafter.

The tank assembly 100 of FIG. 10 differs from the tank assembly 100 of FIGS. 1 to 9 and 11, in particular because the tank assembly 100 of FIG. 10 comprises a securing member 114 which is formed by an annular weld disposed around the bottom opening 103. This annular weld also forms a first sealing member.

As shown in FIG. 10, the securing member 114 is a thermoplastic weld bead. The securing member 114 is formed by a weld between the body 2 and the bottom 102 under the third portion 4.3 of the heating member 4.

In addition, the tank assembly 100 of FIG. 10 comprises an additional sealing gasket 118 and a lip seal 119, like the tank assembly 100 of FIGS. 1 to 9 and 11.

Figure 12:
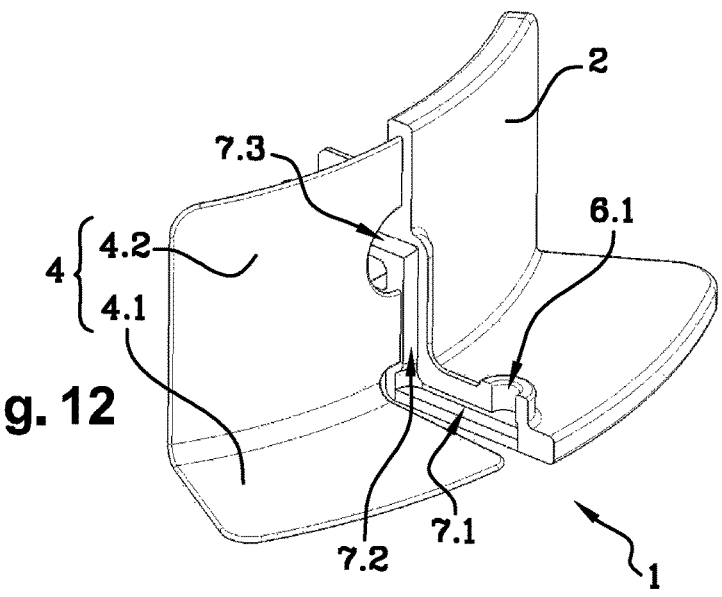
FIG. 12 is a view similar to FIG. 11 and illustrating a transfer device in accordance with a second embodiment of the invention.
Figure 13:
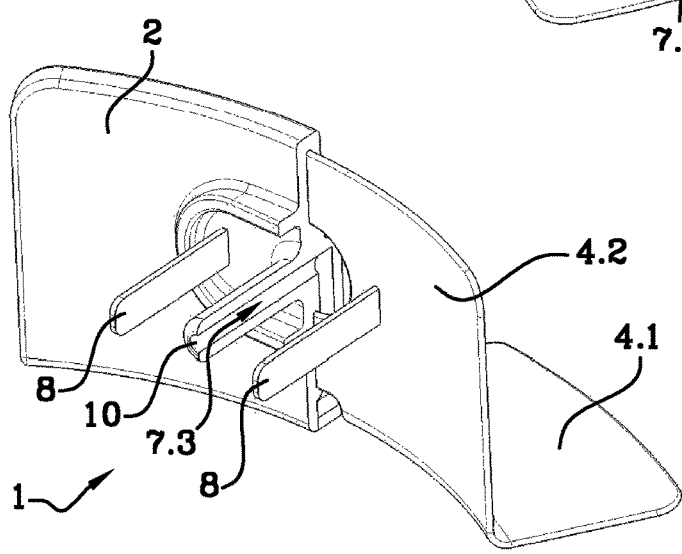
FIG. 13 is a perspective view, at an angle different from FIG. 12, illustrating the transfer device of FIG. 12.

FIGS. 12 and 13 illustrate a transfer device 1 in accordance with a second embodiment. To the extent that the transfer device 1 of FIGS. 12 and 13 is similar to the transfer device 1 of FIGS. 1 to 9 and 11, the description of the transfer device 1 given hereinabove in relation to FIGS. 1 to 9 and 11 may be transposed to the tank assembly 100 and to the transfer device 1 of FIGS. 12 and 13, with the exception of the notable differences set out hereinafter.

The transfer device 1 of FIGS. 12 and 13 differs from the transfer device 1 of FIGS. 1 to 9 and 11, in particular because the third section 7.3 is formed by the connecting element 10. In the example of FIGS. 12 and 13, the third section 7.3 and the connecting element 10 are rectilinear and substantially horizontal when the transfer device 1 is in service configuration.

Of course, the present invention is not limited to the particular embodiments described in the present patent application, nor is it limited to embodiments within the reach of those skilled in the art. Other embodiments may be considered without departing from the scope of the invention, from any element equivalent to an element indicated in the present patent application.

The invention claimed is:

1. A transfer device for transferring a liquid between a tank and a supply module different from an injector, wherein the bottom of the tank presents a protruding portion or counter-form shaped for projecting towards the inner of the tank, so as to define an external cavity outside of the tank and under the protruding portion, and therefore under the tank, and wherein the external cavity houses the supply module, said protruding portion forming a housing, the supply module being configured to distribute a liquid from the tank containing the liquid toward an injector via a downstream conduit, the transfer device being configured to be placed in the tank and on the housing, the transfer device comprising at least:

a body defining at least partially at least one transfer conduit, said at least one transfer conduit having a first orifice and a second orifice, and a heating member overmolded at least partially in the body of the transfer device so as to heat said at least one transfer conduit;

wherein the first orifice and the second orifice are offset along a first direction, and along a second direction, the second direction being perpendicular to the first direction, wherein the second orifice come out to an external cavity formed on the housing inside which the supply module extends.

2. The transfer device according to claim 1, wherein the body and said at least one transfer conduit are arranged so that the first direction is substantially vertical when the transfer device is placed in the tank and on the housing in service configuration.

3. The transfer device according to claim 1, wherein the heating member comprises a first heating portion and a second heating portion, which are arranged so that the altitude of the first heating portion is lower than the altitude of the second heating portion when the transfer device is placed in the tank and on the housing in service configuration, the first heating portion extending transversely to the second heating portion.

4. The transfer device according to claim 3, wherein the first heating portion extends on either side of the first orifice and wherein the second heating portion extends on either side of the first orifice.

5. The transfer device according to claim 1, wherein the heating member has generally the shape of a ring extending over an angle comprised between 250 degrees and 360 degrees, the first orifice being located on or close to the ring.

6. The transfer device according to claim 1, further comprising a securing portion configured to secure the transfer device to the tank.

7. The transfer device according to claim 1, wherein the heating member is overmolded completely in the body of the transfer device.

8. The transfer device according to claim 1, wherein the heating member is configured to convert electrical energy into thermal energy, the heating member comprising electrical resistances.

9. The transfer device according to claim 1, further comprising electrical connectors which are electrically connected to the heating member and which extend at least partially out of the body of the transfer device.

10. The transfer device according to claim 1, further comprising a connecting element which is fluidically connected to the second orifice, the connecting element being configured to fluidically connect said at least one transfer conduit to the supply module extending inside the housing.

11. The transfer device according to claim 1, wherein said at least one transfer conduit comprises at least one first section and one second section, the first section and the second section being oriented respectively along a first line and a second line which are intersecting with and transverse to each other.

12. The transfer device according to claim 1, further comprising a filter connected to the first orifice.

13. A tank assembly, for storing a liquid, for example an aqueous urea solution in a motor vehicle, the tank assembly comprising:

a tank configured to contain the liquid, the tank having a bottom presenting i) a bottom opening configured for the passage of the liquid and ii) a protruding portion which is shaped protruding towards the inner of the tank so as to define a cavity external to the tank under said protruding portion, and therefore under the tank, and wherein the external cavity houses a supply module, said protruding portion forming a housing, a transfer device according to claim 1, the transfer device being placed in the tank and close to the bottom, outside the housing, so that the heating member extends at least partially around the housing, the transfer device and the tank being arranged so that the second orifice is positioned facing the bottom opening.

14. The tank assembly according to claim 13 further comprising a sealing member which is arranged between the transfer device and the tank.

15. The tank assembly according to claim 14, wherein the transfer device further comprises electrical connectors which are electrically connected to the heating member and which extend at least partially out of the body, and a connecting element which is fluidically connected to the second orifice, the connecting element being configured to fluidically connect said at least one transfer conduit to the supply module, the electrical connectors and the connecting element passing through the bottom opening when the tank assembly is in assembled configuration.

16. The tank assembly according to claim 13, wherein the bottom opening has a surface area smaller than 500 mm$^2$.

17. The tank assembly according to claim 13, wherein the first orifice may form an inlet or an outlet of the transfer conduit and conversely the second orifice may form an outlet or an inlet of the transfer conduit.

18. A transfer device for transferring a liquid between a tank and a supply module different from an injector, wherein the bottom of the tank presents a protruding portion or counter-form shaped for projecting towards the inner of the tank, so as to define an external cavity outside of the tank and under the protruding portion, and therefore under the tank, and wherein the external cavity houses the supply module, said protruding portion forming a housing comprising a bottom opening for the passage of the liquid, the supply module being configured to distribute a liquid from the tank containing the liquid toward an injector via a downstream conduit, the transfer device being configured to be placed in the tank and on the housing, the transfer device comprising at least:

a body defining at least partially at least one transfer conduit, said at least one transfer conduit having a first orifice and a second orifice, and a heating member arranged at least partially in the body so as to heat said at least one transfer conduit;

electrical connectors which are electrically connected to the heating member and which extend partially out of the body, wherein each of the electrical connectors extends close to the second orifice.

19. The transfer device according to claim 18, further comprising a connecting element which is fluidically connected to the second orifice.

20. The transfer device according to claim 19, wherein the connecting element is configured to fluidically connect the transfer conduit to the supply module extending in the housing and to the downstream conduit.

21. The transfer device according to claim 19, wherein the connecting element extends between the electrical connectors.

22. The transfer device according to claim 19, wherein the connecting element is formed by a nozzle pierced by a central bore intended for the passage of the liquid.

23. The transfer device according to claim 19, wherein the electrical connectors and the connecting element delimit a joining surface, which is located between the transfer device and the housing when the transfer device is placed on the housing.

24. The transfer device according to claim 19, wherein the electrical connectors and the connecting element pass through the bottom opening when the tank assembly is in assembled configuration.

25. A transfer device for transferring a liquid between a tank and a supply module different from an injector, wherein the bottom of the tank presents a protruding portion or counter-form shaped for projecting towards the inner of the tank, so as to define an external cavity outside of the tank and under the protruding portion, and therefore under the tank, and wherein the external cavity houses the supply module, said protruding portion forming a housing for the passage of the liquid, the supply module being configured to distribute a liquid from the tank containing the liquid toward an injector via a downstream conduit, the transfer device being configured to be placed in the tank and on the housing, the transfer device comprising at least:

a body defining at least partially at least one transfer conduit, said at least one transfer conduit having a first orifice and a second orifice, and a heating member arranged at least partially in the body so as to heat said at least one transfer conduit;

a first closure component and a second closure component, each of the first and second closure components is secured to the body so as to define a portion of the transfer conduit.

26. The transfer device according to claim 25, wherein said at least one transfer conduit comprises at least one first section, one second section and one third section, the first section, the second section and the third section being oriented respectively along a first line, a second line and a third line wherein the first line and the second line are intersecting with and transverse to each other and wherein the second line and the third line are intersecting and transverse with each other.

27. The transfer device according to claim 26, wherein the first closure component defines a portion of the first section of the transfer conduit.

28. The transfer device according to claim 26, wherein the second closure component defines a portion of the third section of the transfer conduit.

29. The transfer device according to claim 25, wherein each of the first and second closure components comprises a plate which has a planar surface arranged so as to define a respective portion of the transfer conduit.

30. A transfer device for transferring a liquid between a tank and a supply module different from an injector, wherein the bottom of the tank presents a protruding portion or counter-form shaped for projecting towards the inner of the tank, so as to define an external cavity outside of the tank and under the protruding portion, and therefore under the tank, and wherein the external cavity houses the supply module, said protruding portion forming a housing for the passage of the liquid, the supply module being configured to distribute a liquid from the tank containing the liquid toward an injector via a downstream conduit, the transfer device being configured to be placed in the tank and on the housing, said bottom of the tank presenting a protruding portion which is shaped protruding towards the inner of the tank so as to define a cavity external to the tank under said protruding portion, the transfer device comprising at least:

a body having the shape of a «C» or of an open ring extending over an angle equal to about 270 degrees, adapted to the geometry of the bottom wherein the body defines at least partially at least one transfer conduit having a first orifice and a second orifice, said first orifice being located on this open ring; and a heating member arranged at least partially in the body so as to heat said at least one transfer conduit.

31. The transfer device according to claim 30, wherein the heating member has the shape of a "C".

32. The transfer device according to claim 30, wherein said at least one transfer conduit comprises at least one first section, one second section and one third section, the first section, the second section and the third section being oriented respectively along a first line, a second line and a third line wherein the first line and the second line are intersecting with and transverse to each other and wherein the second line and the third line are intersecting and transverse with each other.

33. The transfer device according to claim 32, wherein the first heating portion extends on either side of the first orifice and the second heating portion extends on either side of the first orifice and on either side of the second section in such a way that the first heating portion and the second heating portion allow heating a large area of the housing.

34. The transfer device according to claim 32, wherein the heating member further comprises a third heating portion which is arranged to heat the third section of the transfer conduit.

35. The transfer device according to claim 30, wherein the heating member comprises at least a first heating portion and a second heating portion, the altitude of the first heating portion being lower than the altitude of the second heating portion when the transfer device is in service configuration.

36. The transfer device according to claim 35, wherein the first heating portion extends transversely to the second heating portion.

37. The transfer device according to claim 35, wherein the second heating portion is substantially perpendicular to the first heating portion in such a way that the first heating portion extends over a first surface and the second heating portion extends over a second surface which is transverse to the first surface.

38. The transfer device according to claim 35, wherein the first heating portion is configured to extend substantially horizontally when the transfer device is in service configuration to heat an area of the housing.

39. The transfer device according to claim 35, wherein the second heating portion is configured to extend substantially vertically when the transfer device is in service configuration to heat a portion of the transfer conduit.

* * * * *